US 9,186,999 B2

(12) United States Patent
Yokoyama

(10) Patent No.: US 9,186,999 B2
(45) Date of Patent: Nov. 17, 2015

(54) SHOVEL

(71) Applicant: SUMITOMO HEAVY INDUSTRIES, LTD., Tokyo (JP)

(72) Inventor: Kazuya Yokoyama, Yokosuka (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/445,112

(22) Filed: Jul. 29, 2014

(65) Prior Publication Data

US 2014/0333238 A1   Nov. 13, 2014

Related U.S. Application Data

(63) Continuation of application No. PCT/JP2013/053088, filed on Feb. 8, 2013.

(30) Foreign Application Priority Data

Feb. 10, 2012   (JP) ................................ 2012-026853

(51) Int. Cl.
| | |
|---|---|
| H02P 1/00 | (2006.01) |
| H02P 3/00 | (2006.01) |
| H02P 5/00 | (2006.01) |
| B60L 11/18 | (2006.01) |
| E02F 9/08 | (2006.01) |
| H01M 2/10 | (2006.01) |

(Continued)

(52) U.S. Cl.
CPC ............... *B60L 11/18* (2013.01); *E02F 9/0858* (2013.01); *E02F 9/2091* (2013.01); *E02F 9/24* (2013.01); *H01M 2/1077* (2013.01)

(58) Field of Classification Search
CPC ........................... B60L 11/18; H01M 2220/20
USPC .......................................................... 318/139
See application file for complete search history.

(56) References Cited

U.S. PATENT DOCUMENTS

| | | |
|---|---|---|
| 2012/0234613 A1 | 9/2012 | Miyatake |
| 2013/0065103 A1 | 3/2013 | Yumura |

FOREIGN PATENT DOCUMENTS

| | | |
|---|---|---|
| CN | 102640347 A | 8/2012 |
| CN | 102906900 A | 1/2013 |

(Continued)

OTHER PUBLICATIONS

International Search Report dated Apr. 23, 2013 corresponding to International Patent Application No. PCT/JP2013/053088 and English translation thereof.

*Primary Examiner* — Erick Glass
(74) *Attorney, Agent, or Firm* — Squire Patton Boggs (US) LLP

(57) ABSTRACT

A shovel includes a power storage device, and an electric motor to which electric power is supplied from the power storage device. The power storage device includes a housing; a first power storage module including a plurality of laminated power storage cells stacked in a first direction, a first terminal, and a second terminal and being housed within the housing; a first electrode and a second electrode fixed to the housing; a first relay current path configured to electrically connect the first terminal to the first electrode; and a second relay current path configured to electrically connect the second terminal to the second electrode. The first relay current path includes a distance adjustment structure configured to compensate variations in the distance between the first electrode and the first terminal.

10 Claims, 16 Drawing Sheets

(51) Int. Cl.
*E02F 9/20* (2006.01)
*E02F 9/24* (2006.01)

(56) References Cited

FOREIGN PATENT DOCUMENTS

| | | |
|---|---|---|
| DE | 11 2010 004 703 T5 | 11/2012 |
| DE | 11 2011 101 767 T5 | 3/2013 |
| JP | 2005-116445 A | 4/2005 |
| JP | 3894183 B2 | 3/2007 |
| JP | 2009-283193 A | 12/2009 |
| JP | 2010-218716 A | 9/2010 |
| JP | 2012-004064 A | 1/2012 |
| JP | 2012-099311 A | 5/2012 |
| JP | 5102902 B2 | 12/2012 |
| JP | 2013-038439 A | 2/2013 |
| JP | 5505260 B2 | 5/2014 |
| KR | 10-2012-0088807 A | 8/2012 |
| KR | 10-2013-0031297 A | 3/2013 |
| WO | WO 2011/070758 A1 | 6/2011 |
| WO | WO 2011/148641 A1 | 12/2011 |

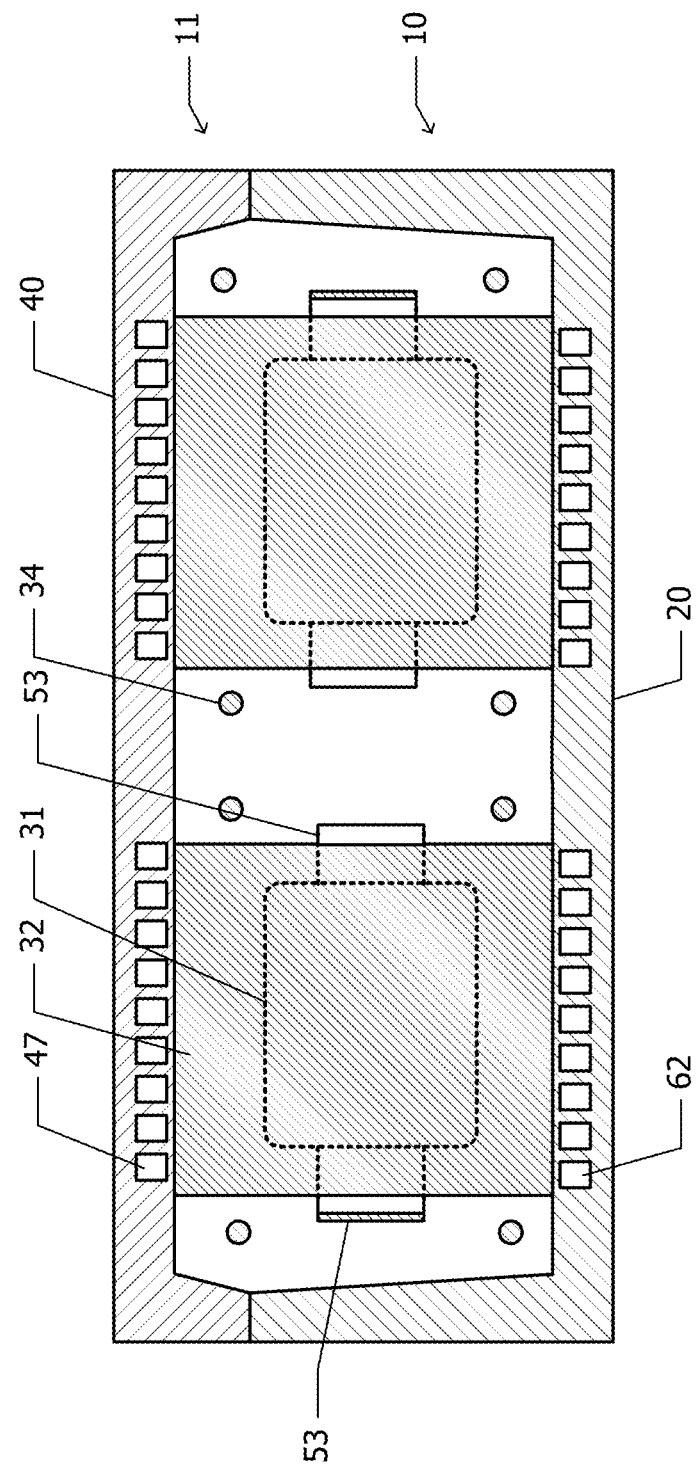

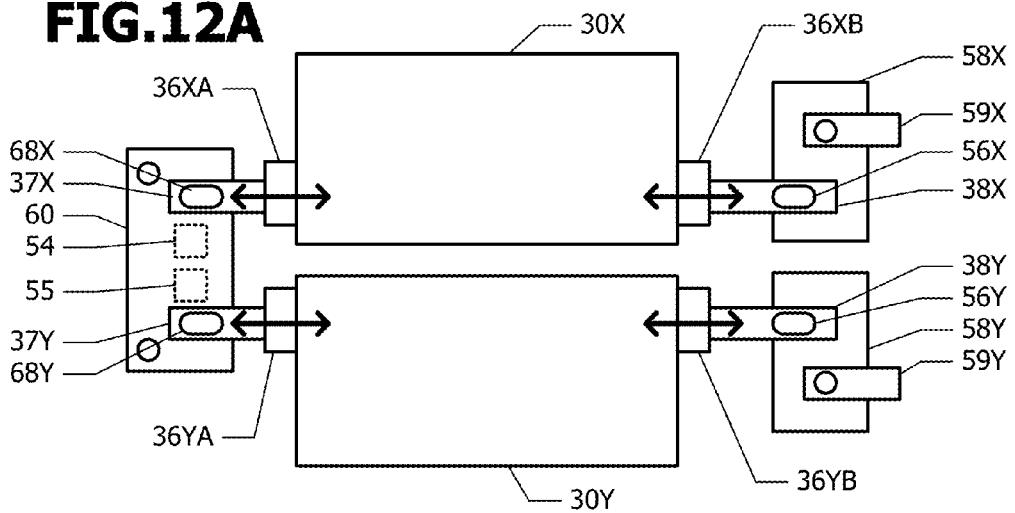
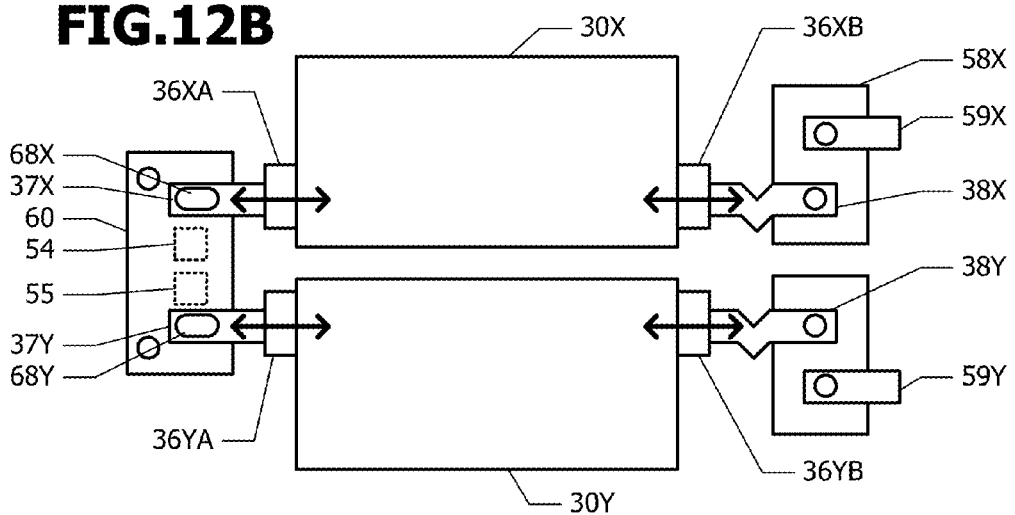
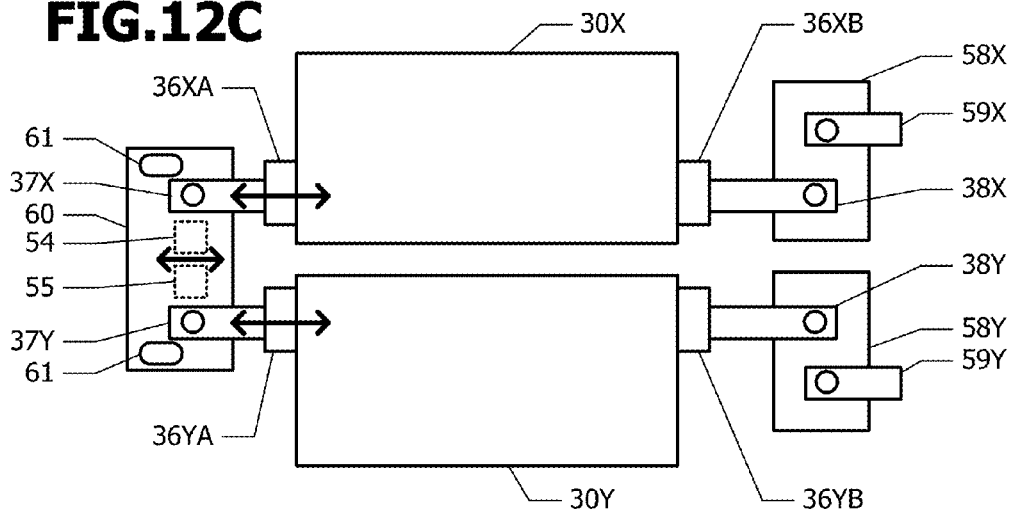

SHOVEL

RELATED APPLICATIONS

Priority is claimed to Japanese Patent Application No. 2012-026853, filed Feb. 10, 2012, and International Patent Application No. PCT/JP2013/053088, the entire content of each of which is incorporated herein by reference.

BACKGROUND

1. Technical Field

The present invention relates to a shovel mounted with a power storage device including a power storage module in which a plurality of power storage cells are stacked.

2. Description of the Related Art

Power storage modules are well-known in which a plurality of plate-shaped power storage cells are stacked and the stacked power storage cells are connected in series. Heat transfer plates for cooling are inserted between the power storage cells. Push plates are arranged at both ends of a stacked body of the power storage cells and the heat transfer plates, and tie rods are passed through the two push plates. The tie rods apply compressive forces to the stacked body.

Two pairs of wall plates are arranged at the sides, top, and bottom of the stacked body. One pair of wall plates is thermally coupled with the heat transfer plates via end surfaces of the heat transfer plates to thereby absorb the heat of the heat transfer plates. The two push plates and the two pairs of wall plates are fixed with bolts to constitute a strong parallelepiped structure. This can enhance the shock resistance of the power storage modules.

SUMMARY

According to an embodiment of the present invention, there is provided a shovel including a power storage device; and an electric motor to which electric power is supplied from the power storage device. The power storage device includes a housing; a first power storage module including a plurality of laminated power storage cells stacked in a first direction, a first terminal, and a second terminal and being housed within the housing; a first electrode and a second electrode fixed to the housing; a first relay current path configured to electrically connect the first terminal to the first electrode; and a second relay current path configured to electrically connect the second terminal to the second electrode. The first relay current path includes a distance adjustment structure configured to compensate variations in the distance between the first electrode and the first terminal.

BRIEF DESCRIPTION OF THE DRAWINGS

FIG. 8 is a cross-sectional view taken along one-dot chain line 8-8 of FIG. 3.

FIGS. 12A to 12C are schematic plan views of a power storage device according to another embodiment and its modifications.

DETAILED DESCRIPTION

Variations occur in the thickness of the power storage cells due to manufacturing variations. Since variations also occur in the length of a power storage module in which the power storage cells are stacked, the distances between the push plates arranged at both ends of the power storage module no longer remain the same among products. For this reason, the dimensions of a parallelepiped structure having the push plates as a set of wall surfaces vary. If variations occur in dimensions among products, handling the products becomes inconvenient. The length of the power storage module can be made constant by inserting a spacer for adjusting the variations in dimension between the power storage cells. In this method, the assembly work of the power storage module becomes complicated, and leads to a cost increase.

It is desirable to provide a power storage device that can compensate variations without using a spacer even if variations have occurred in the thickness of power storage cells.

According to the following embodiments, even if the dimensions of the power storage module vary, the power storage module can be easily fixed within the housing.

Figure 1A:
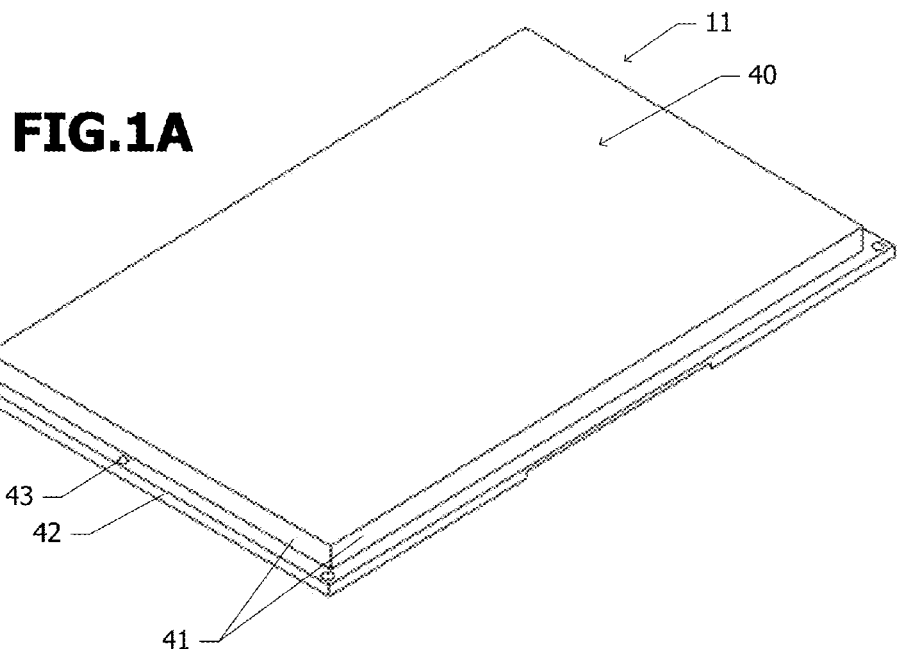
FIGS. 1A and 1B are respectively perspective views of an upper housing and a lower housing of a power storage device according to one embodiment.
Figure 1B:
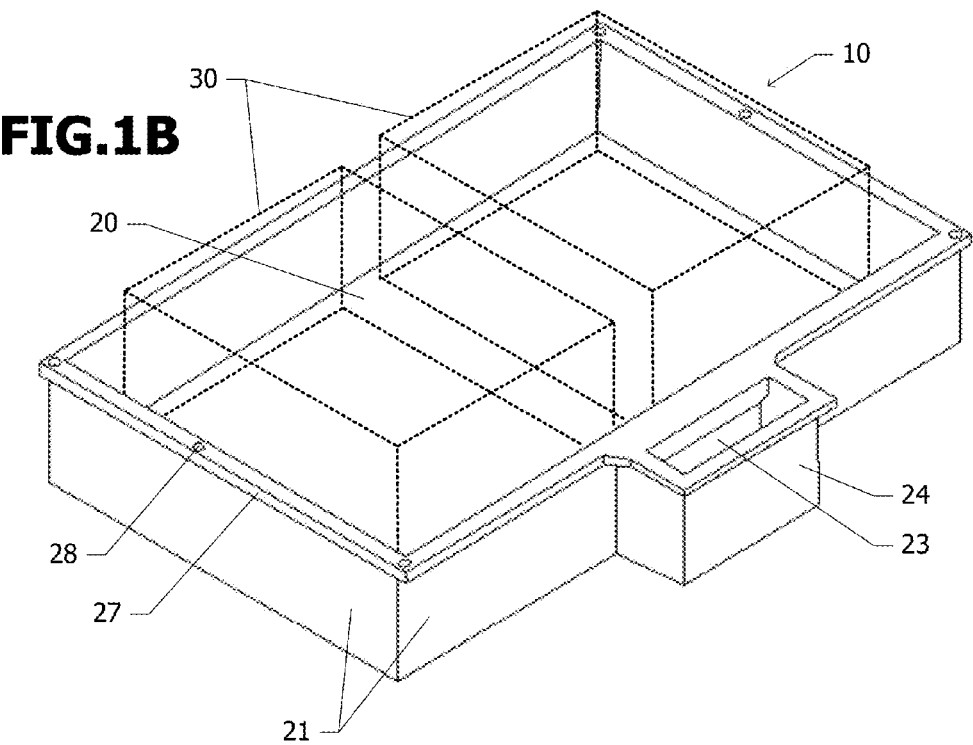

FIGS. 1A and 1B show perspective views of an upper housing 11 and a lower housing 10 in which a power storage module according to one embodiment is housed, respectively.

As illustrated in FIG. 1B, the lower housing 10 includes an oblong bottom panel 20, and four side panels 21 extending upward from the edges of the bottom panel 20. The lower housing 10 is open upward. An open portion of the lower housing 10 is closed by the upper housing 11 (FIG. 1A). Upper ends of the side panels 21 are provided with a flange 27. The flange 27 is formed with a plurality of through-holes 28 for allowing bolts to pass therethrough. Each of the lower housing 10 and the upper housing 11 is formed by, for example, a casting process.

Two power storage modules 30 are attached on the bottom panel 20. Each of the power storage modules 30 has a structure in which a plurality of power storage cells are stacked. The two power storage modules 30 are arranged side by side so that stacking directions of the power storage cells are parallel to each other. An opening 23 is formed at the center of one side panel 21 intersecting a stacking direction of the power storage modules 30.

A connector box 24 is arranged outside the side panel 21 formed with the opening 23 so as to close the opening 23. The connector box 24 is open upward. This open portion is closed by a connector. The power storage modules 30 are connected to an external electric circuit via the connector.

The upper housing 11 includes a top panel 40 and side panels 41 extending downward from the edges of the top panel 40. An outer periphery of the top panel 40 is matched with an outer periphery of the bottom panel 20 of the lower housing 10. The height of the side panels 41 of the upper housing 11 is smaller than the height of the side panels 21 of the lower housing 10. For example, the height of the side panels 41 is about 25% of the height of the side panels 21. Lower ends of the side panels 41 are provided with a flange 42. The flange 42 is formed with a plurality of through-holes 43. The through-holes 43 are arranged at positions corresponding to the through-holes 28 of the lower housing 10. Flow passages (not shown) for a cooling medium are formed inside the top panel 40 and the bottom panel 20.

Figure 2A:
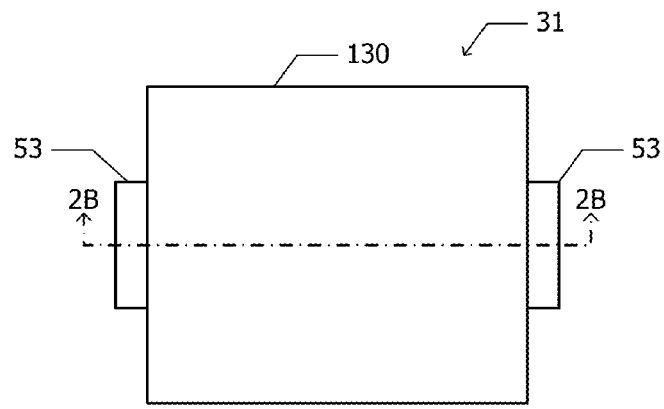
FIG. 2A is a plan view of a power storage cell.

FIG. 2A illustrates a plan view of a laminated power storage cell 31 used for the power storage device according to the embodiment shown in FIG. 1. For example, an electric double layer capacitor, a lithium ion secondary battery, a lithium ion capacitor, or the like is used for the power storage cell 31. Electrode tabs 53 are led out in opposite directions from two edges parallel to each other of a power storage container 130 having a substantially oblong planar shape.

Figure 2B:
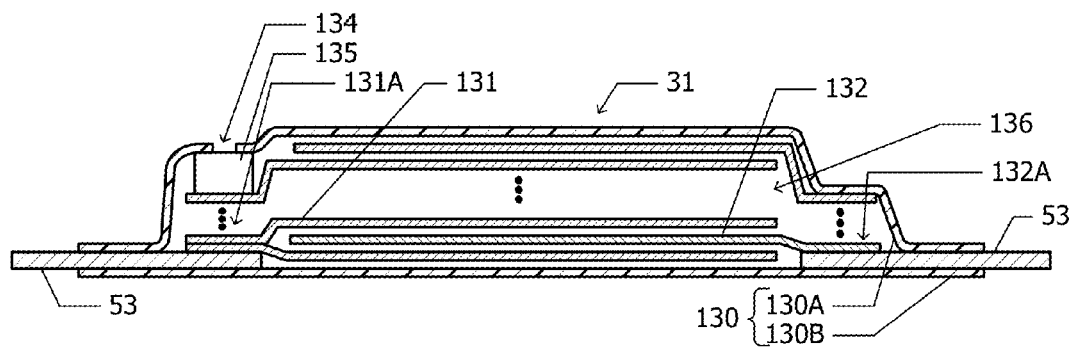
FIG. 2B is a cross-sectional view of the power storage cell.

FIG. 2B illustrates a cross-sectional view taken along one-dot chain line 2B-2B of FIG. 2A. The power storage container 130 is constituted by two aluminum laminate films 130A and 130B. The aluminum laminate films 130A and 130B sandwich a power storage laminated body 136, and seal the power storage laminated body 136. One aluminum laminate film 130B is substantially flat, and the other aluminum laminate film 130A is deformed so as to reflect the shape of the power storage laminated body 136.

Figure 2C:
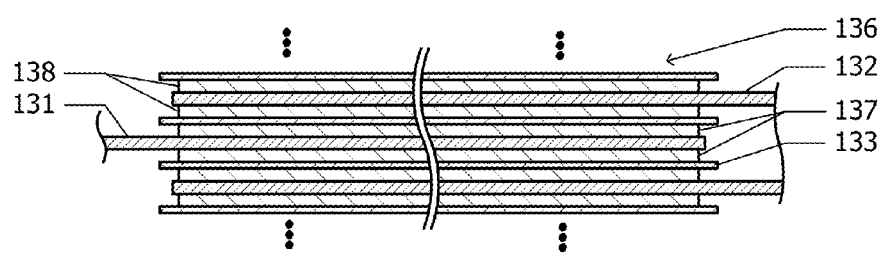
FIG. 2C is a cross-sectional view of a laminated structure within the power storage cell.

FIG. 2C illustrates a partial cross-sectional view of the power storage laminated body 136. Polarizable electrodes 137 as positive electrodes are formed on both sides of a positive electrode current collector 131, and polarizable electrodes 138 as negative electrodes are formed on both sides of a negative electrode current collector 132. For example, aluminum foil is used for the positive electrode current collector 131 and the negative electrode current collector 132. The polarizable electrodes 137 as positive electrodes are formed, for example, by heating and fixing a slurry containing a binder in which activated carbon particles are mixed, after the slurry is coated on the surfaces of the positive electrode current collector 131. The polarizable electrodes 138 as negative electrodes are also formed by the same method. When the slurry is coated, it is difficult to make the thickness of coated films constant. For this reason, variations occur in the thickness of the polarizable electrodes 137 and 138. As a result, variations also occur in the thickness of the power storage cell 31.

The positive electrode current collector 131 and the polarizable electrodes 137 formed on both sides thereof are referred to as a "positive electrode plate", and the negative electrode current collector 132 and the polarizable electrodes 138 formed on both sides thereof are referred to as a "negative electrode plate". The positive electrode plates and the negative electrode plates are alternately laminated. A separator 133 is arranged between the positive electrode plate and the negative electrode plate. For example, cellulose paper is used for the separator 133. An electrolytic solution is impregnated in this cellulose paper. For example, a polarizable organic solvent, such as propylene carbonate, ethylene carbonate, or ethyl methyl carbonate, is used for a solvent of the electrolytic solution. Quaternary ammonium salt, for example, spirobipyrrolidinium tetrafluoroborate (SBPB4), is used as an electrolyte (supporting electrolyte). The separator 133 prevents short-circuiting between the polarizable electrodes 137 as positive electrodes and the polarizable electrodes 138 as negative electrodes, and short-circuiting between the positive electrode current collector 131 and the negative electrode current collector 132.

Description will be continued referring back to FIG. 2B. In FIG. 2B, the description of the separator 133 and the polarizable electrodes 137 and 138 is omitted.

The positive electrode current collector 131 and the negative electrode current collector 132 have connecting portions 131A and 132A extending in directions opposite to each other (leftward and rightward in FIG. 2A) from overlapping regions of both, respectively. The connecting portions 131A of a plurality of the positive electrode current collectors 131 are overlapped with one another, and are ultrasonically welded to one electrode tab 53. The connecting portions 132A of a plurality of the negative electrode current collectors 132 are overlapped with one another, and are ultrasonically welded to the other electrode tab 53. For example, aluminum plates are used for the electrode tabs 53.

The electrode tabs 53 pass between the aluminum laminate film 130A and the aluminum laminate film 130B, and are led out to the outside of the power storage container 130. The electrode tabs 53 are heat-welded to the aluminum laminate film 130A and the aluminum laminate film 130B, at lead-out points.

A gas vent valve 135 is arranged between the connecting portion 131A of the positive electrode current collector 131, and the aluminum laminate film 130A. The gas vent valve 135 is arranged so as to block a gas vent hole 134, and is heat-welded to the aluminum laminate film 130A. The gas generated within the power storage container 130 is released to the outside through the gas vent valve 135 and the gas vent hole 134.

The inside of the power storage container 130 is evacuated. For this reason, the aluminum laminate films 130A and 130B are deformed by atmospheric pressure so as to conform to the outer shape of the power storage laminated body 136 and the gas vent valve 135.

Figure 3:
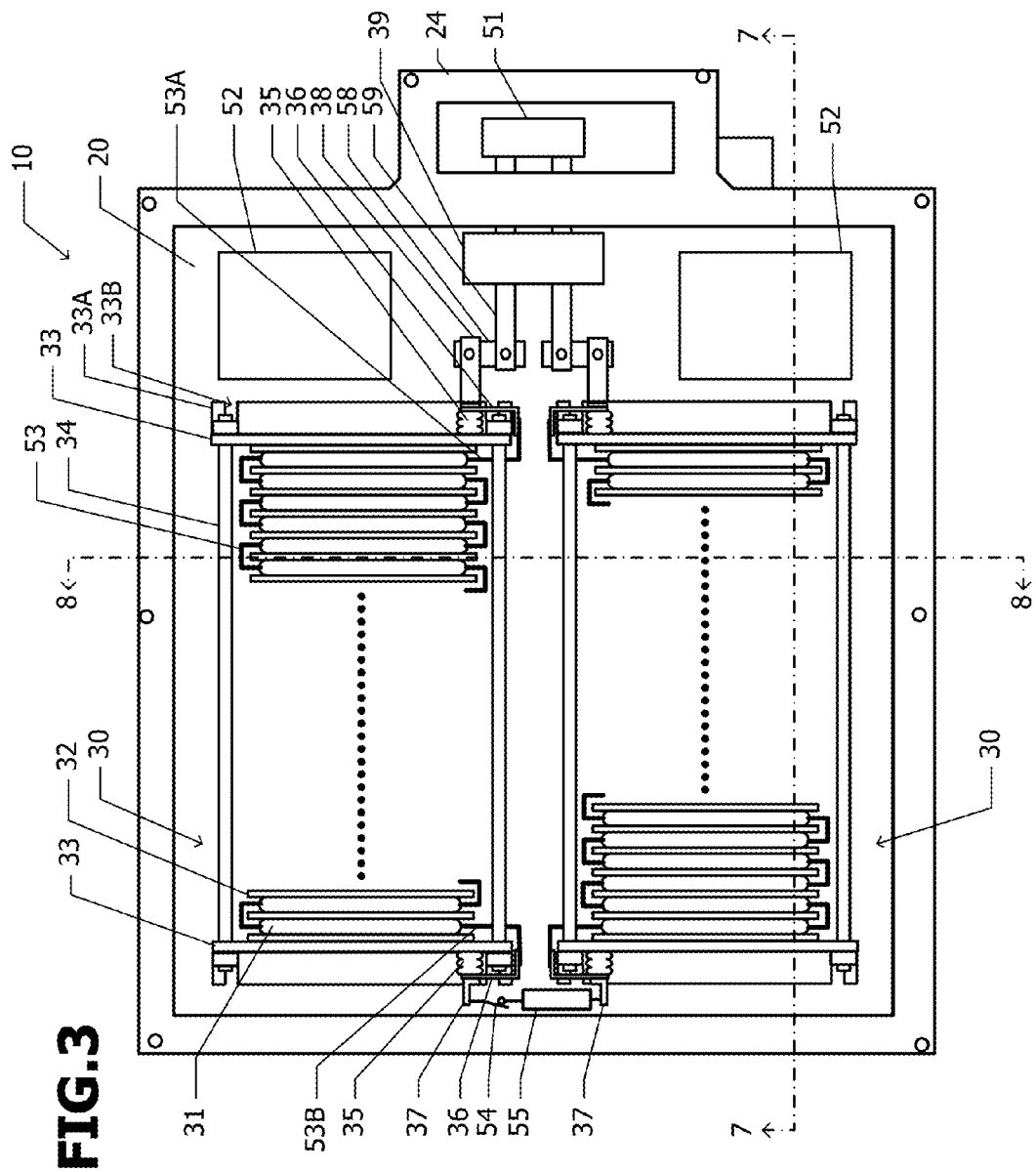
FIG. 3 is a plan view of the lower housing of the power storage device according to the embodiment shown in FIG. 1 and parts housed therein.

FIG. 3 illustrates a plan view of the lower housing 10 and parts housed within the lower housing 10. The power storage modules 30 are arranged on the bottom panel 20. Hereinafter, the structure of each power storage module 30 will be described.

The plurality of power storage cells 31 and a plurality of heat transfer plates 32 are stacked. Each of the power storage cells 31 have the same structure as that illustrated in FIGS. 2A to 2C. For example, an aluminum plate is used for the heat transfer plate 32. Although an example in which one power storage cell 31 and one heat transfer plate 32 are alternately stacked is illustrated in FIG. 3, one power storage cell and one heat transfer plate are not necessarily stacked alternately. For example, two power storage cells 31 and one heat transfer plate 32 may be stacked as one set.

Push plates 33 are arranged at both ends of a stacked body of the power storage cells 31 and the heat transfer plates 32. A plurality of, for example, four tie rods 34 extends from one push plate 33 to the other push plate 33, and apply a compressive force in a stacking direction to the stacked body of the power storage cells 31 and the heat transfer plates 32.

The plurality of power storage cells 31 are connected in series by connecting the electrode tabs 53. The electrode tabs 53 are connected to each other outside the edges of the heat transfer plates 32, and are insulated from the heat transfer plates 32. The electrode tabs 53 at both ends of the power storage cells 31 that are connected in series are referred to as "terminals" 53A and 53B. The terminals 53A and 53B serve as terminals for charging and discharging the power storage module 30. Fixed terminals 36 are connected to the terminals 53A and 53B. The fixed terminals 36 are fixed to the outside surfaces of the push plates 33 via insulators 35. Since the thickness of the power storage cells 31 varies, usually, the dimensions (lengths) of the two power storage modules 30 in the stacking direction are not the same.

Lower ends of the push plates 33 are bent in an L-shape. Screw-locking notches (fastening portions) 33B are formed in portions 33A closer to tips than the bending points. The push plates 33 are screw-locked to the bottom panel 20 of the lower housing 10 with screws passing through the notches 33B. In order to compensate variations in the length of the power storage module 30, the length (dimension of the stacking direction) of the notches 33B is set to be equal to or larger than half of the maximum amplitude of variations in the length of the power storage module 30. Since the notches 33B are formed in the push plate 33 at both ends of the power storage module 30, the power storage module 30 can be screw-locked to the lower housing 10 by setting the respective lengths of the notches 33B to the above-described length to thereby compensate variations in the lengths of the power storage modules 30.

Bus bars 37 are respectively connected to the fixed terminals 36 on first sides (on the left side of FIG. 3) of the two power storage modules 30, which are distant from the connector box 24. The two bus bars 37 are connected to each other via a fuse 55 and a safety switch 54.

The fixed terminals 36 on the second sides (on the right side in FIG. 3) of the two power storage modules 30 are respectively connected to conductive supporting members 58 via bus bars 38. Each supporting member 58 is insulated from the lower housing 10 and is fixed to the lower housing 10. An electrode 59 connected to a relay circuit 39 is connected to each supporting member 58. The bus bar 38 and the supporting member 58 function as a relay current path that connects the fixed terminal 36 and the electrode 59. The relay circuit 39 is connected to a connector 51 in the connector box 24.

An electrical component 52 required for the operation of the power storage module 30 is housed in an empty space within the lower housing 10.

Figure 4A:
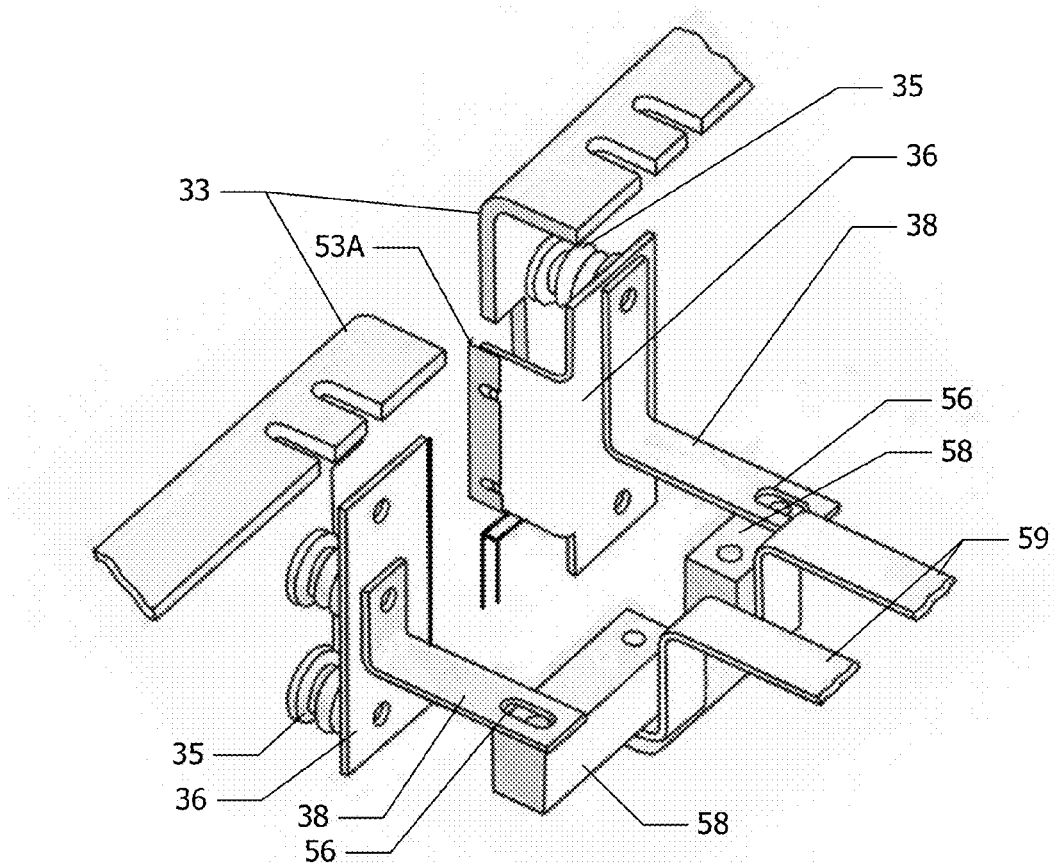
FIG. 4A is a perspective view illustrating the structure of a portion that connects terminals of power storage modules of the power storage device according to the embodiment shown in FIG. 1 to electrodes.

FIG. 4A illustrates a perspective view of a connection structure from one terminal 53A of the power storage module 30 to the electrode 59. The fixed terminal 36 is fixed to the outside surface of the push plate 33 via the insulator 35. The fixed terminal 36 is connected to the terminal 53A outside the edges of the push plate 33. One end of the bus bar 38 bent in an L-shape is fastened to the insulator 35 together with the fixed terminal 36.

Figure 4B:
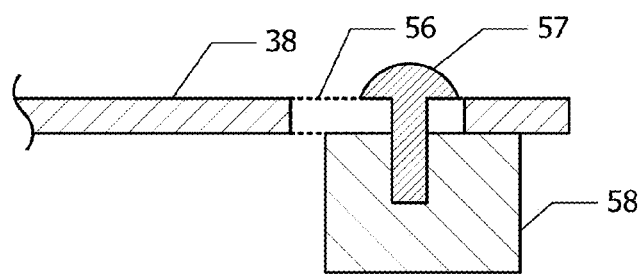
FIG. 4B is a cross-sectional view of a portion that fixes a bus bar to a supporting member.

The other end of the bus bar 38 is screw-locked to a top surface of the conductive supporting member 58. The supporting member 58 is fixed to the lower housing 10 (FIG. 1B), and is electrically insulated from the lower housing 10. The bus bar 38 is formed with an elongated hole 56 for allowing the bus bar to be screw-locked to the supporting member 58. As illustrated in FIG. 4B, a fastener (screw) 57 passes through the elongated hole 56, and is tightened to the supporting member 58. The elongated hole 56 has a shape that is elongated in the stacking direction of the power storage modules 30 (FIG. 3). Variations in the length of the power storage module 30 can be compensated by changing the relative positional relationship between the elongated hole 56 and the screw 57 in the stacking direction.

As illustrated in FIG. 4A, the electrode 59 is connected to a bottom surface of the supporting member 58. In order to match the height of the electrode 59 with the height of a terminal of the relay circuit 39 (FIG. 3), the electrode is first bent upward, and is then directed to the relay circuit 39. An attachment point of the bus bar 38 to the supporting member 58 deviates in a direction parallel to the bottom panel 20 (FIG. 1B) of the lower housing 10 and orthogonal to the stacking direction of the power storage modules 30 (FIG. 3) with respect to the attachment point of an electrode 59. If the power storage module 30 longer than average is fixed to the lower housing 10, the bus bar 38 is arranged so as to deviate further toward the relay circuit 39 than an average position. Since the electrode 59 and the bus bar 38 deviate from each other in the direction orthogonal to the stacking direction of the power storage modules 30, the bus bar 38 does not interfere spatially with the electrode 59 even if the bus bar 38 deviates toward the relay circuit 39.

During assembling, the relay circuit 39, the electrode 59 and the supporting member 58 are attached to the lower housing 10 (FIG. 1B) in advance. Thereafter, the power storage module 30 (FIG. 3) is mounted on the lower housing 10. Since the bus bar 38 is formed with the elongated hole 56, the power storage module 30 can be attached without correcting the position of the supporting member 58 even if the length of the power storage module 30 to be mounted varies.

Figure 5:
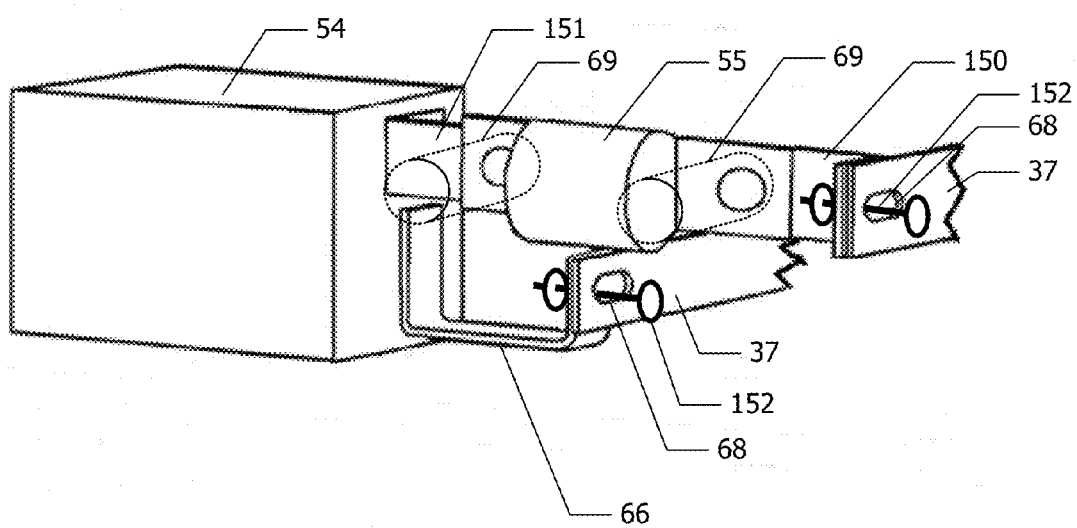
FIG. 5 is a perspective view illustrating a connection structure between a fuse and a safety switch.

FIG. 5 illustrates a perspective view of a connecting portion between the safety switch 54 and the fuse 55. The fuse 55 is fixed to a side panel 21 (FIG. 1B) of the lower housing 10 via the insulator 69. The safety switch 54 is also fixed to the side panel 21 (FIG. 1B) of the lower housing 10. Instead, the fuse 55 and the safety switch 54 may be attached to the bottom panel 20 (FIG. 1B) of the lower housing 10. An electric circuit including the power storage module 30 can be disconnected by a worker manually operating the safety switch 54.

Elongated holes 68 that are elongated in the stacking direction of the power storage modules 30 (FIG. 3) are respectively formed at the tips of the two bus bars 37 (refer to FIG. 3).

The bus bar 37 extending from one power storage module 30 is connected to one terminal of the fuse 55 via a bus bar 150. The bus bar 150 is fastened to the insulator 69 together with the terminal of the fuse 55. The bus bar 37 and the bus bar 150 function as a relay current path that connects the fuse 55 and the left fixed terminal 36 of the lower power storage module 30 in FIG. 3. The other terminal of the fuse 55 is connected to the safety switch 54 via a bus bar 151. The bus bar 37 extending from the other power storage module 30 is connected to the safety switch 54 via the electrode 66 constituted by a bus bar. The electrode 66 is fixed to the safety switch 54. The bus bars 37 and 150, and the bus bar 37 and the electrode 66 are connected by fasteners (a bolt and a nut) 152 inserted into the elongated holes 68 formed in the bus bars 37, respectively.

Since the bus bar 37 is formed with the elongated hole 68, variations in the length of the power storage module 30 (FIG. 3) can be compensated. For this reason, the power storage module 30 can be attached to the lower housing 10 without correcting the position of the bus bar 150 connected to the fuse 55 or the position of the electrode 66 fixed to the safety switch 54.

Figure 6:
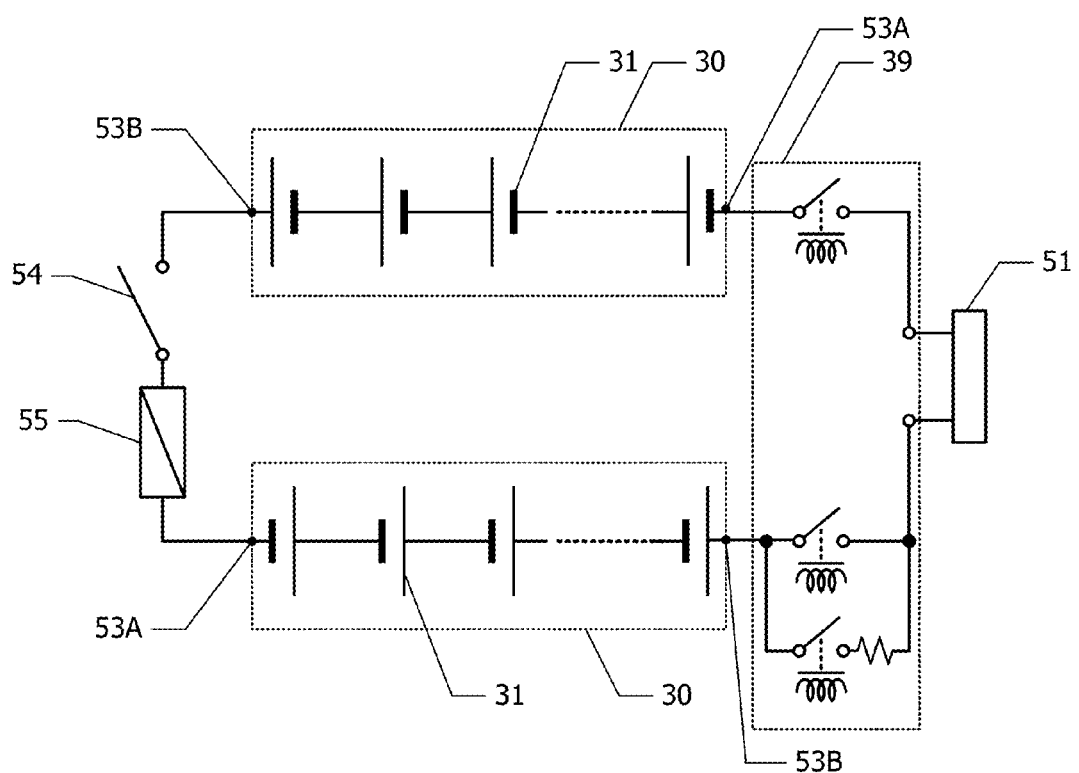
FIG. 6 is an equivalent circuit schematic of the power storage device according to the embodiment shown in FIG. 1.

FIG. 6 illustrates an equivalent circuit schematic of the power storage device. The power storage module 30 includes the plurality of power storage cells 31 that are connected in series. The terminal (positive electrode) 53B of one power storage module 30 is connected to the terminal (negative electrode) 53A of the other power storage module 30 via the safety switch 54 and the fuse 55. The terminal (negative electrode) 53A of the one power storage module 30 and the terminal (positive electrode) 53B of the other power storage module 30 are connected to the connector 51 via the relay circuit 39. A resistance element connected in series to a relay is provided in order to keep a rush current from occurring when an external capacitor is pre-charged.

Figure 7:
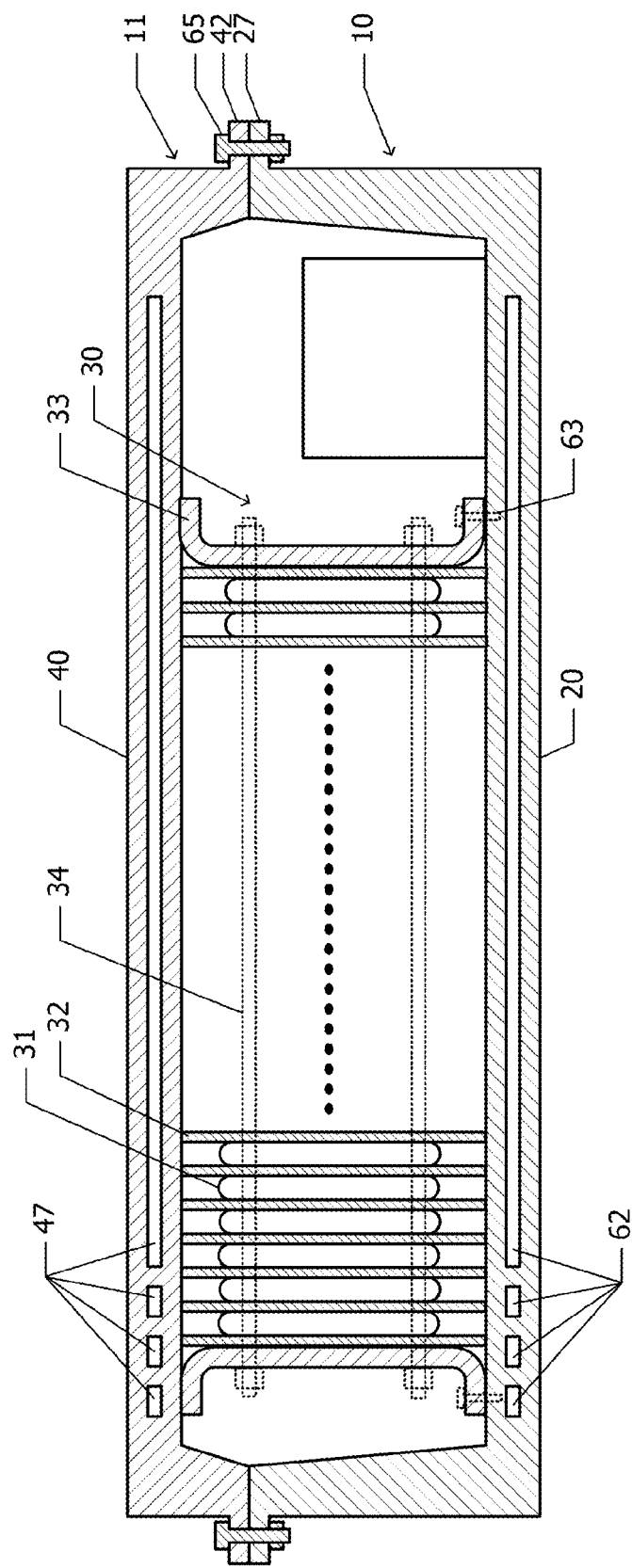
FIG. 7 is a cross-sectional view taken along one-dot chain line 7-7 of FIG. 3.

FIG. 7 illustrates a cross-sectional view taken along one-dot chain line 7-7 of FIG. 3. The push plates 33 of the power storage module 30 are fixed to the bottom panel 20 of the lower housing 10 with screws 63. An upper opening portion of the lower housing 10 is closed by the upper housing 11. Fasteners 65 pass through the flange 27 of the lower housing 10 and the flange 42 of the upper housing 11. The fasteners 65 apply forces to the lower housing 10 and the upper housing 11 in directions in which both the housings are brought close to each other. A gasket may be inserted between contact surfaces of the lower housing 10 and the upper housing 11 if necessary. This causes a space between the lower housing 10 and the upper housing 11 to be hermetically isolated from the outside. In addition, the connector box 24 (FIG. 3) is provided with an opening portion that is accessible from the outside. This opening portion is also hermetically closed using the gasket or the like.

The heat transfer plates 32 come into contact with the bottom panel 20 of the lower housing 10 on bottom end surfaces thereof, and come into contact with the top panel 40 of the upper housing 11 on top end surfaces thereof. Since the upper housing 11 is pressed against the lower housing 10 by the fasteners 65, the positions of the heat transfer plates 32 are firmly fixed within the housings. The screws 63 serve to temporarily fix the power storage module 30 to the lower housing 10 in a midway stage of the assembling of the power storage device. It is difficult to ensure sufficient reliability against severe vibration during fixation using only the screws 63. Particularly when the power storage device is mounted on working machines, such as a shovel, high reliability is required against vibration or shock. In the power storage device according to the above embodiment, the power storage module 30 is firmly and unslidably fixed within the housing by pressurization using the fasteners 65. For this reason, when the power storage device is mounted on working machines, such as a shovel, sufficient reliability can also be ensured.

The top panel 40 of the upper housing 11 is formed with the flow passages 47. The bottom panel 20 of the lower housing 10 is formed with the flow passages 62.

The power storage cells 31 are thermally coupled with a cooling medium flowing through the flow passages 47 and 62, via the heat transfer plates 32. The end surfaces of the heat transfer plates 32 are brought into close contact with the bottom panel 20 and the top panel 40 by the forces that press the upper housing 11 against the lower housing 10. This can enhance the heat-transfer efficiency from the heat transfer plates 32 to the bottom panel 20 and the top panel 40.

FIG. 8 illustrates a cross-sectional view taken along one-dot chain line 8-8 of FIG. 3. A lower end of each heat transfer plate 32 is in contact with the bottom panel 20 of the lower housing 10, and an upper end thereof is in contact with the top panel 40 of the upper housing 11. The electrode tabs 53 are respectively led out from the left and right edges of each power storage cell 31. The electrode tabs 53 pass through portions outside the edge of the heat transfer plate 32, and are connected to the electrode tabs 53 of the next power storage cell 31. The tie rods 34 are attached to positions that do not come into contact with the heat transfer plates 32 and the electrode tabs 53.

The flow passages 62 are formed by the bottom panel 20 of the lower housing 10 and a flat plate 60, and the flow passages 47 are formed by the top panel 40 and a flat plate 61. The flow passages 47 and 62 are preferentially arranged within a region where the heat transfer plates 32 are arranged in a lateral direction (width direction) of FIG. 8. For this reason, the heat transfer plates 32 can be efficiently cooled.

In the above embodiment, variations in the length of the power storage module 30 are compensated by forming the elongated hole 56 (FIG. 4) in the bus bar 38 that connects the fixed terminal 36 and the supporting member 58. In order to compensate variations in the length of the power storage module 30, other connection structures for connecting the fixed terminal 36 and the supporting member 58 may be adopted.

Figure 9A:
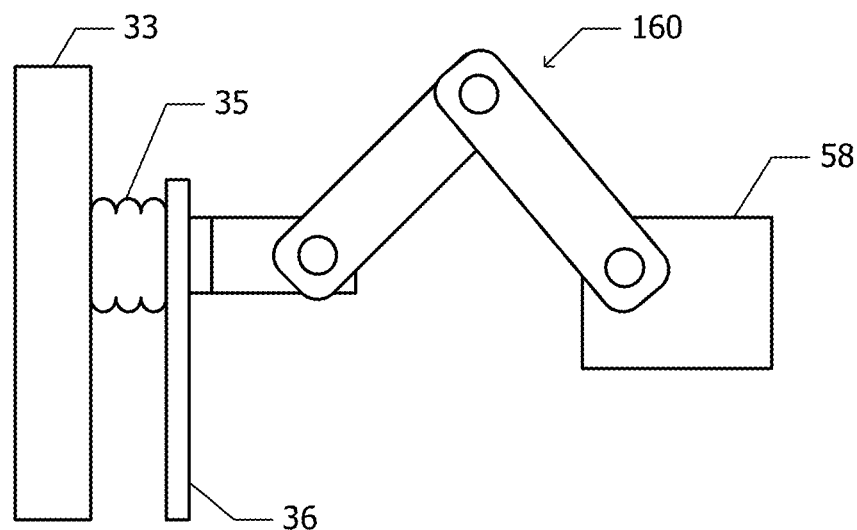
FIGS. 9A and 9B are schematic side views of the connection structure according to modification of the embodiment shown in FIG. 1.
Figure 9B:
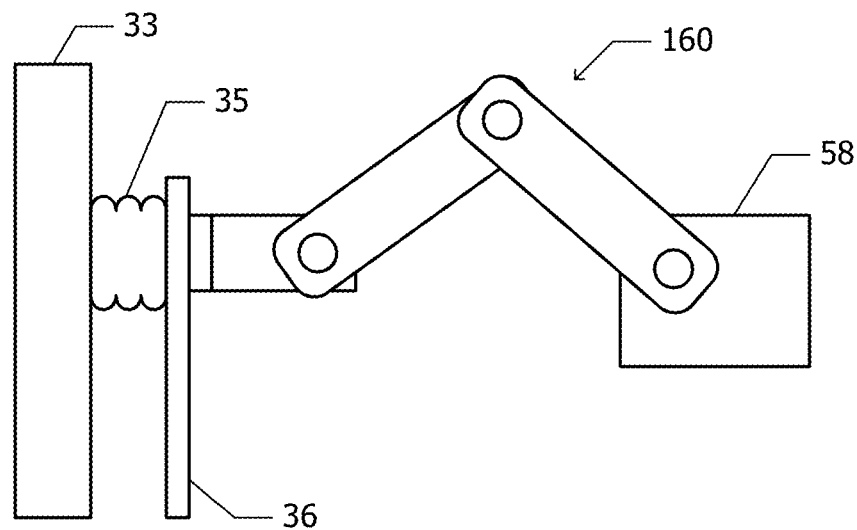

FIGS. 9A and 9B illustrate schematic side views of a connection structure according to modification of the above embodiment. The fixed terminal 36 and the supporting member 58 may be connected by a link mechanism 160 having at least two arms. Variations in the length of the power storage module 30 can be compensated by adjusting the angle between the two arms of the link mechanism 160. When the spacing between the fixed terminal 36 and the supporting member 58 becomes large as illustrated in FIG. 9B, the angle between the two arms may be increased.

Figure 10A:
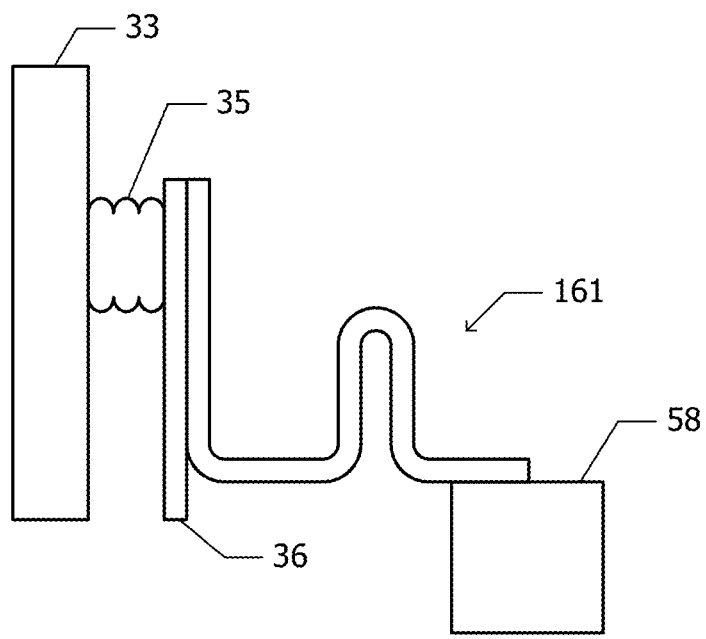
FIGS. 10A and 10B are schematic side views of a connection structure according to modification of the embodiment shown in FIG. 1.
Figure 10B:
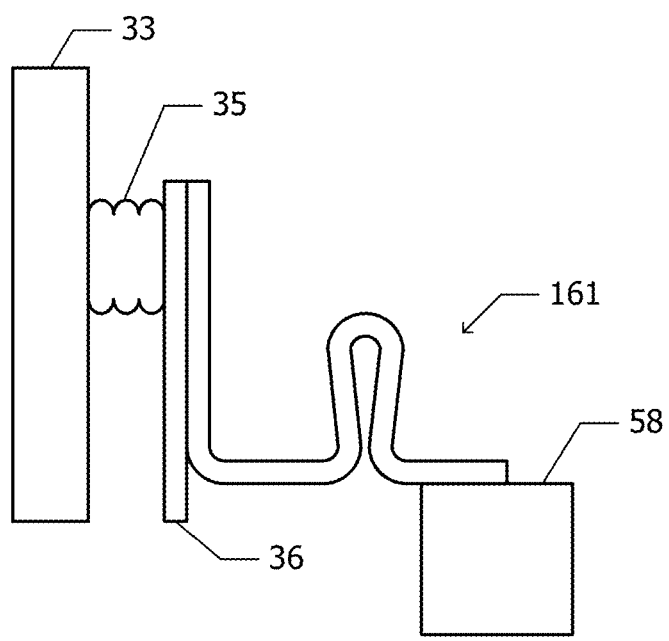

FIGS. 10A and 10B illustrate schematic side views of a connection structure according to another modification of the above embodiment. A curved bus bar 161 connecting the fixed terminal 36 and the supporting member 58 is formed with a hairpin-like curved portion. Variations in the length of the power storage module 30 can be compensated by increasing or decreasing the degree of curve of the curved portion. When the spacing between the fixed terminal 36 and the supporting member 58 becomes small as illustrated in FIG. 10B, the degree of curve of the curved portion may be increased. A high current cable may be used instead of the curved bus bar 161.

Figure 11A:
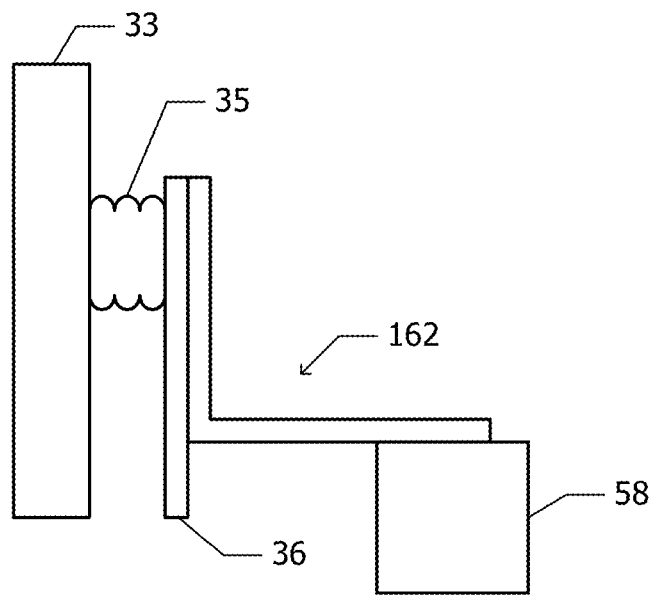
FIGS. 11A and 11B are schematic side views of a connection structure according to modification of the embodiment shown in FIG. 1.
Figure 11B:
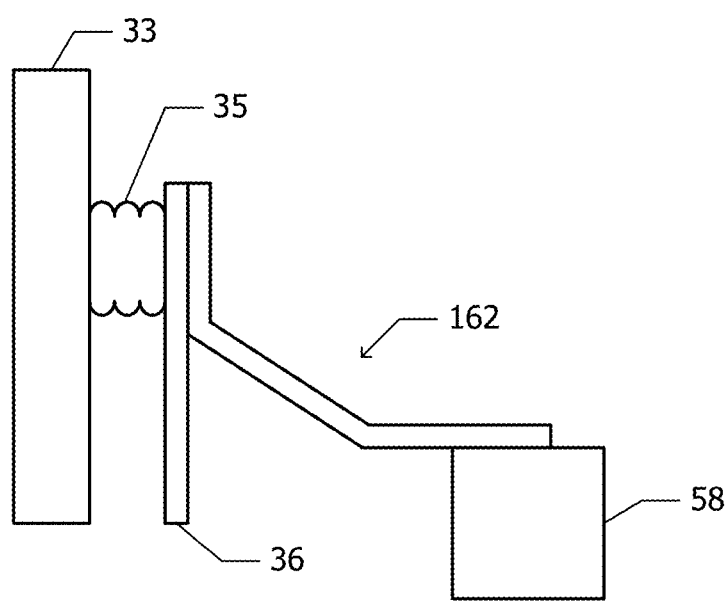

FIGS. 11A and 11B illustrate schematic side views of a connection structure according to further another modification of the above embodiment. The fixed terminal 36 and the supporting member 58 are connected by a bending bus bar 162. Variations in the length of the power storage module 30 can be compensated by adjusting the positions of bending points of the bending bus bar 162 and the number of the bending points. When the fixed terminal 36 and the supporting member 58 are brought closest to each other, the bending bus bar 162 may be bent at about 90° at one point as illustrated in FIG. 11A. When the spacing between the fixed terminal 36 and the supporting member 58 is large as illustrated in FIG. 11B, the bending bus bar 162 may be bent at two points so as to form a shape taking a shortcut obliquely between fixed portions of both ends of the bending bus bar 162. In this modification, it is preferable that a bending tool is prepared in order for a worker to be able to bend the bus bar 162 at an arbitrary angle at an arbitrary point.

A power storage device according to another embodiment will be described with reference to FIGS. 12A to 14C. In this embodiment, attention is paid to a distance adjustment structure for compensating variations in the length of the power storage module 30 (FIG. 3), including the power storage device according to the above embodiment shown in FIGS. 1A to 11B. In FIGS. 12A to 12C and FIGS. 14A to 14C, both arrows in left-and-right directions are given to certain members which may vary in positions in the stacking direction.

FIG. 12A illustrates a schematic plan view of the power storage device according to an embodiment. Two power storage modules 30X and 30Y are arranged side by side in a position in which the stacking directions of the power storage cells 31 (FIG. 3) is parallel to each other. Fixed terminals 36XA and 36XB are fixed to both ends of one power storage module 30X. Fixed terminals 36YA and 36YB are fixed to both ends of the other power storage module 30Y. The fixed terminals 36XA, 36XB, 36YA, and 36YB are equivalent to the fixed terminals 36 illustrated in FIGS. 3 and 4A.

Bus bars 37X and 37Y are connected to the fixed terminals 36XA and 36YA, respectively. The bus bars 37X and 37Y are equivalent to the bus bars 37 illustrated in FIGS. 3 and 5. A switch current path 60 includes the safety switch 54 and the fuse 55 (FIG. 5). The bus bar 37X and the bus bar 37Y are connected by the switch current path 60.

Bus bars 38X and 38Y are connected to the fixed terminals 36XB and 36YB, respectively. The bus bars 38X and 38Y are equivalent to the bus bars 38 illustrated in FIGS. 3 and 4A. The bus bars 38X and 38Y are connected to supporting members 58X and 58Y, respectively. The supporting members 58X and 58Y are equivalent to the supporting members 58 illustrated in FIGS. 3 and 4A. Electrodes 59X and 59Y are connected to the supporting members 58X and 58Y, respectively. The electrodes 59X and 59Y are equivalent to the electrodes 59 illustrated in FIGS. 3 and 4A.

The electrodes 59X and 59Y, the supporting members 58X and 58Y, and the switch current path 60 are fixed in a state where the positions thereof cannot be adjusted with respect to the lower housing 10 (FIG. 3). The fixed terminals 36XA, 36XB, 36YA, and 36YB are fixed to the lower housing 10 (FIG. 3) in a state where the positions thereof in the stacking direction can be adjusted according to variations in the dimensions of the power storage modules 30A and 30B.

The bus bar 38X and the supporting member 58X function as a relay current path that connects the electrode 59X and the fixed terminal 36XB. This relay current path includes a distance adjustment structure for compensating variations in the distance between the electrode 59X and the fixed terminal 36XB in the stacking direction. Specifically, an elongated hole 56X provided in the bus bar 38X and fasteners (screw) fixed to the supporting member 58X through the elongated hole 56X serve as the distance adjustment structure. This fastener is equivalent to the screw 57 illustrated in FIG. 4B. The bus bar 38Y is also provided with the same elongated hole 56Y. The elongated holes 56X and 56Y are equivalent to the elongated holes 56 illustrated in FIG. 4A.

The bus bar 37X, the switch current path 60, the bus bar 37Y, the power storage module 30Y, the bus bar 38Y, and the supporting member 58Y function as a relay current path that connects the electrode 59Y and the fixed terminal 36XA. This relay current path includes a distance adjustment structure for compensating variations in the distance between the electrode 59Y and the fixed terminal 36XA in the stacking direction. Specifically, an elongated hole 68X provided in the bus bar 37X and a fastener fixed to the switch current path 60 through the elongated hole 68X serves as the distance adjustment structure. The elongated hole 68X is equivalent to the elongated hole 68 illustrated in FIG. 5. This fastener is equivalent to the fastener 152 illustrated in FIG. 5. The bus bar 37Y is also provided with the same elongated hole 68Y.

FIG. 12B illustrates a schematic plan view of a power storage device according to modification of the embodiment shown in FIG. 12A. In this modification shown in FIG. 12B, the bus bars 38X and 38Y are not formed with the elongated holes 56X and 56Y (FIG. 12A) but formed with circular holes. The bus bar 38X can compensate variations in the spacing between the circular hole and the fixed terminal 36XB in the stacking direction. The bus bar 38X is equivalent to the link mechanism 160 illustrated in FIG. 9A, the curved bus bar 161 illustrated in FIG. 10A, or the bending bus bar 162 illustrated in FIG. 11A. The bus bar 38X serves as a positioning structure.

FIG. 12C illustrates a schematic plan view of a power storage device according to another modification of the embodiment shown in FIG. 12A. In this modification shown in FIG. 12C, circular holes are formed in the bus bars 38X and 38Y instead of the elongated holes 56X and 56Y (FIG. 12A). The bus bars 38X and 38Y are formed from a plate with high rigidity. For this reason, the positions of the fixed terminals 36XB and 36YB cannot be adjusted. Variations occur at the positions of the fixed terminal 36XA and 36YA due to variations in the lengths of the power storage modules 30X and 30Y.

The bus bars 37X and 37Y are provided with the circular holes. For this reason, the distance between the fixed terminal 36XA and the switch current path 60 in the stacking direction cannot be adjusted. The position of the switch current path 60 should be corrected according to variations in the positions of the fixed terminals 36XA and 36YA. An elongated hole 61 is provided in order to attach the switch current path 60 to the lower housing 10 (FIG. 3).

Figure 13:
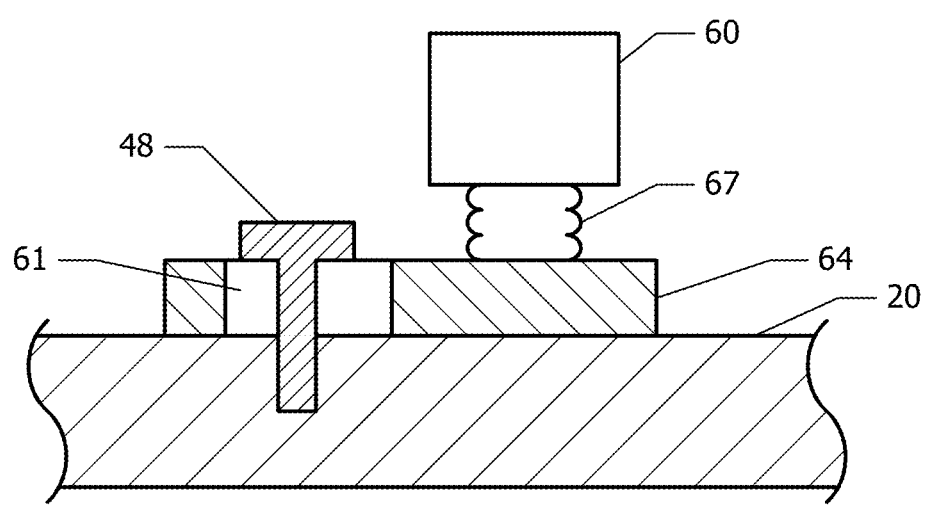
FIG. 13 is a cross-sectional view of the safety switch and the lower housing.

FIG. 13 illustrates a cross-sectional view of the switch current path 60 and the lower housing 10. The fixing member 64 is provided with the elongated hole 61. The elongated hole 61 has a planar shape that is elongated in the stacking direction of the power storage modules 30X and 30Y. A fixing member 64 is fixed to the bottom panel 20 of the lower housing 10 by a fastener 48 (screw). The switch current path 60 is fixed to the fixing member 64 via an insulator 67. Since the elongated hole 61 through which the fastener 48 passes has a planar shape that is elongated in the stacking direction, the positions of the fixing member 64 and the switch current path 60 in the stacking direction can be adjusted.

The bus bar 37X, the switch current path 60, the bus bar 37Y, the power storage module 30Y, the bus bar 38Y, and the supporting member 58Y function as a relay current path that connects the electrode 59Y and the fixed terminal 36XA. This relay current path includes a distance adjustment structure for compensating variations in the distance between the electrode 59Y and the fixed terminal 36XA in the stacking direction. Specifically, the elongated hole 61 (FIG. 13) provided in the fixing member 64 and the fastener 48 serve as the distance adjustment structure.

The configuration of the modification shown in FIG. 12C can be adopted when the lengths of the power storage modules 30X and 30Y are substantially the same.

Figure 14A:
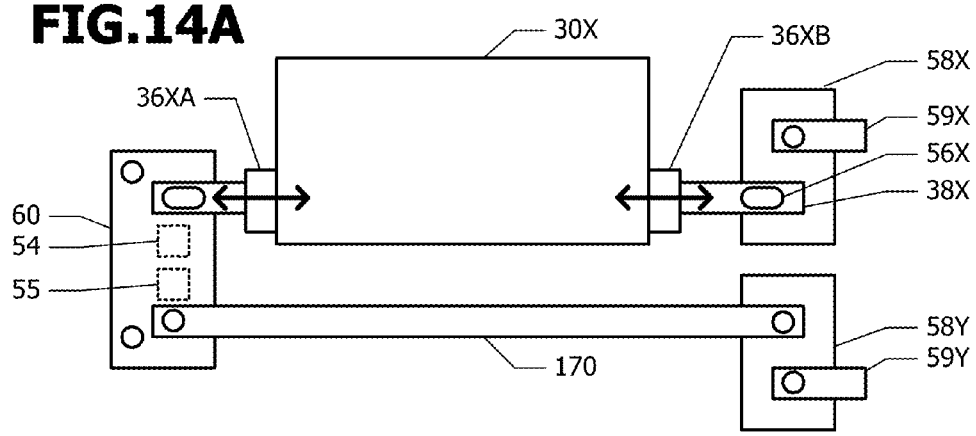
FIGS. 14A to 14C are schematic plan views of the power storage device according to further another embodiment and its modifications.

FIG. 14A illustrates a schematic plan view of a power storage device according to further another modification of the embodiment shown in FIG. 12A. In this modification, one power storage module 30Y of FIG. 12A is substituted with a bus bar 170. The bus bar 170 connects the supporting member 58Y and the switch current path 60. Since variations do not occur at the positions of the supporting member 58Y and the switch current path 60, the bus bar 170 does not need to have the function of adjusting distance.

Variations in the distance between the electrode 59Y and the fixed terminal 36XA in the stacking direction are compensated by the elongated hole 68X provided in the bus bar 37X.

Figure 14B:
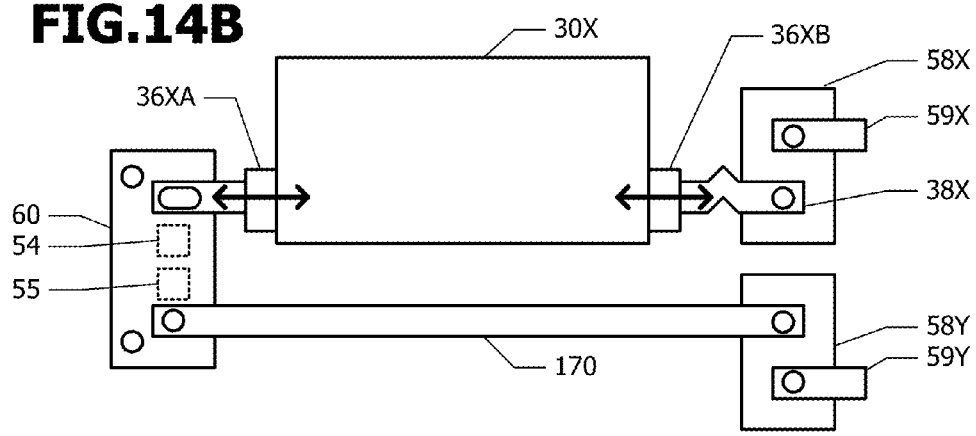

FIG. 14B illustrates a schematic plan view of a power storage device according to still further another modification of the embodiment shown in FIG. 12A. In this modification, one power storage module 30Y of FIG. 12B is substituted with the bus bar 170. The bus bar 170 connects the supporting member 58Y and the switch current path 60.

In this modification shown in FIG. 14B, variations in the distance between the electrode 59Y and the fixed terminal 36XA in the stacking direction are also compensated by the elongated hole 68X provided in the bus bar 37X, similar to the modification shown in FIG. 14A.

Figure 14C:
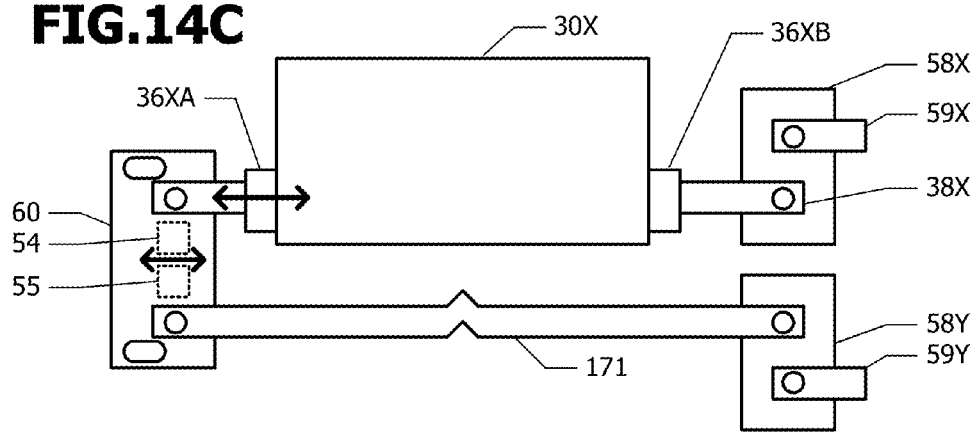

FIG. 14C illustrates a schematic plan view of a power storage device according to further another modification of the embodiment shown in FIG. 12A. In this modification, one power storage module 30Y of FIG. 12C is substituted with a bus bar 171. The bus bar 171 connects the supporting member 58Y and the switch current path 60. In this modification shown in FIG. 14C, since variations occur at the position of the switch current path 60, the bus bar 171 has the function of compensating variations in the distance between the fixed terminal 36XA and the electrode 59Y in the stacking direction. For example, the bus bar 171 is realized by the same structure as the link mechanism 160 (FIG. 9A), the curved bus bar 161 (FIG. 10A), or the bending bus bar 162 (FIG. 11A).

The elongated hole 61 and the bus bar 171 serve as a distance adjustment structure that compensates variations in the distance between the electrode 59Y and the fixed terminal 36XA in the stacking direction.

Figure 15:
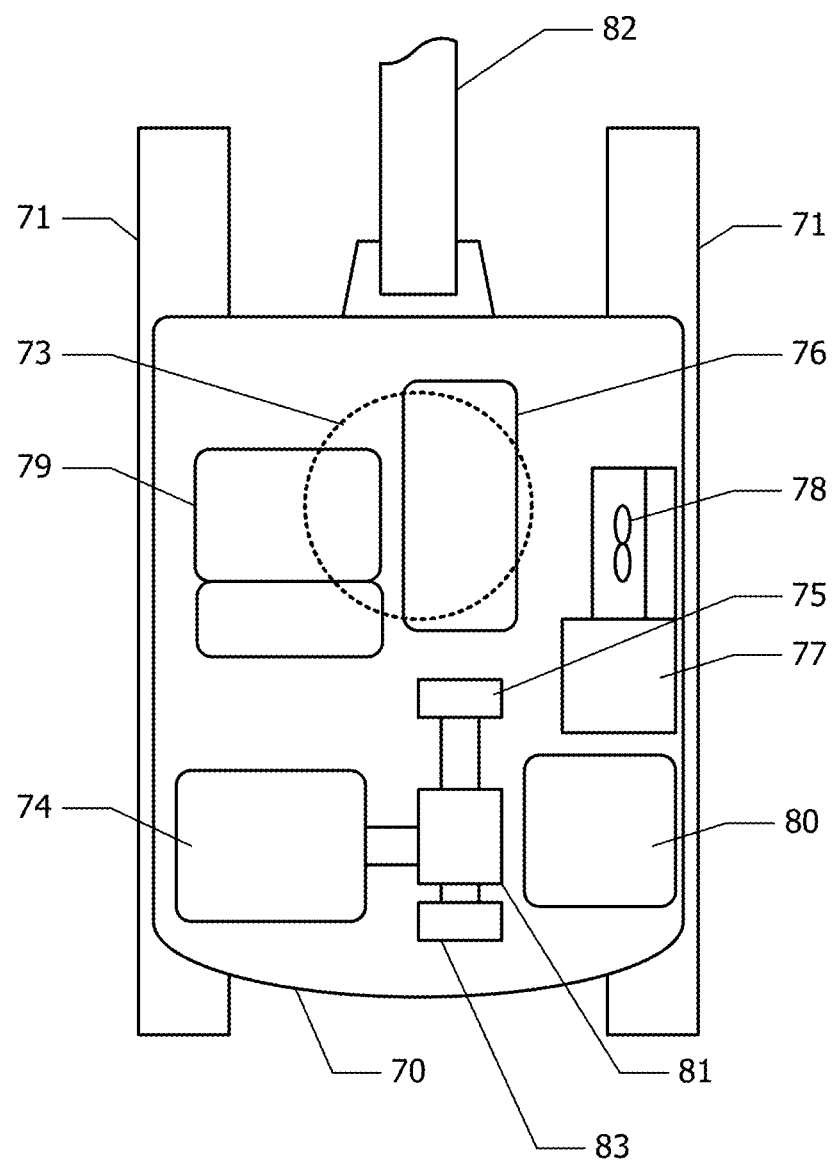
FIG. 15 is a schematic plan view of a shovel according to still further another embodiment.

FIG. 15 illustrates a schematic plan view of a shovel as an example of a hybrid working machine according to further another embodiment. A lower traveling body 71 is attached to an upper swivel body 70 via a swiveling bearing 73. The upper swivel body 70 is mounted with an engine 74, a hydraulic pump 75, a swiveling motor (electrically driven part) 76, an oil tank 77, a cooling fan 78, a seat 79, a power storage device 80, and a motor generator (electrically driven part) 83. The engine 74 generates motive power through combustion of fuel. The engine 74, the hydraulic pump 75, and the motor generator 83 mutually send and receive a torque via a torque transmission mechanism 81. The hydraulic pump 75 supplies pressurized oil to a hydraulic cylinder for a boom 82 or the like. The power storage device according to the above embodiments or modifications thereof shown in FIGS. 1 to 14 is used for the power storage device 80.

The motor generator 83 is driven by the motive power of the engine 74 to generate electricity (power-generating operation). The generated electric power is supplied to the power storage device 80, and the power storage device 80 is charged. Additionally, the motor generator 83 is driven by the electric power from the power storage device 80, and generates motive power for assisting the engine 74 (assisting operation). The oil tank 77 stores oil for a hydraulic circuit. The cooling fan 78 suppresses a rise in the oil temperature of the hydraulic circuit. An operator sits down on the seat 79 to manipulate the shovel.

The swiveling motor 76 is driven by the electric power supplied from the power storage device 80. The swiveling motor 76 swivels the upper swivel body 70. Additionally, the swiveling motor 76 generates regenerative electric power by converting kinetic energy into electrical energy. The power storage device 80 is charged by the generated regenerative electric power.

Figure 16:
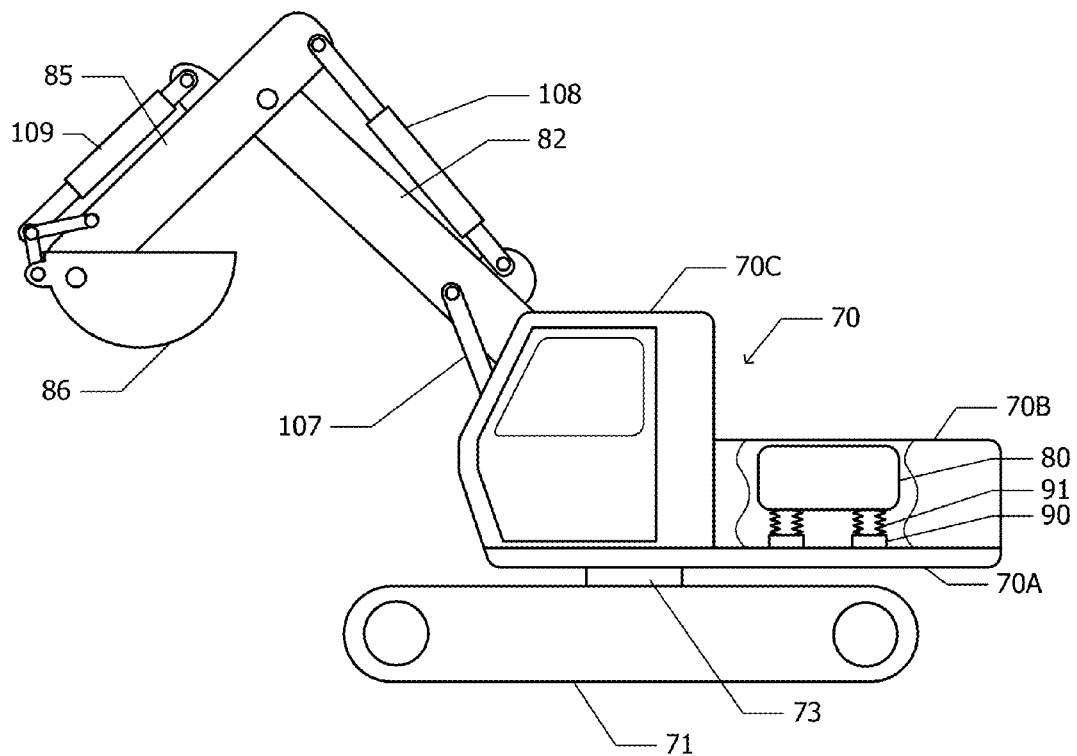
FIG. 16 is a partially broken side view of the shovel according to the embodiment shown in FIG. 15.

FIG. 16 illustrates a partially broken side view of the shovel according to the embodiment shown in FIG. 15. The upper swivel body 70 is mounted on the lower traveling body 71 via the swiveling bearing 73. The upper swivel body 70 includes a swiveling frame 70A, a cover 70B, and a cabin 70C. The swiveling frame 70A functions as a supporting structure of the cabin 70C and various other parts. The cover 70B covers various parts mounted on the swiveling frame 70A, for example, the power storage device 80. The seat 79 (FIG. 15) is housed within the cabin 70C.

The swiveling motor 76 (FIG. 15) swivels the swiveling frame 70A, which is an object to be driven, in a clockwise direction or in a counterclockwise direction with respect to the lower traveling body 71. The boom 82 is attached to the upper swivel body 70. The boom 82 is swung in an up-and-down direction with respect to the upper swivel body 70 by the boom cylinder 107 that is hydraulically driven. An arm 85 is attached to the tip of the boom 82. The arm 85 is swung in a front-and-rear direction with respect to the boom 82 by the arm cylinder 108 that is hydraulically driven. A bucket 86 is attached to the tip of the arm 85. The bucket 86 is swung in the up-and-down direction with respect to the arm 85 by a bucket cylinder 109 that is hydraulically driven.

The power storage device 80 is mounted on the swiveling frame 70A via a mount 90 for a power storage device, and a damper (vibration-proofing device) 91. The power storage device 80 is arranged, for example, behind the cabin 70C. The cover 70B covers the power storage device 80.

The swiveling frame 70A vibrates greatly during traveling and working compared to general transportation vehicles. For this reason, the power storage device 80 mounted on the swiveling frame 70A is apt to receive a large vibration. Since the power storage device according to the above embodiments or modifications thereof shown in FIGS. 1 to 14 is used for the power storage device 80, sufficient reliability can be ensured against a shock.

Although the invention has been described above on the basis of the embodiments, the invention is not limited to these embodiments. For example, it will be obvious to those skilled in the art that various changes, improvements, combinations, or the like are possible.

Inventions supported by the following Appendixes are disclosed on the basis of the above embodiments.

Appendix 1

A power storage device including a housing; a first power storage module including a plurality of laminated power storage cells which are stacked, a first terminal, and a second terminal and being housed within the housing; a first electrode fixed to the housing; and a relay current path are configured to electrically connect the first terminal to the first electrode and configured to compensate variations in the distance between the first electrode and the first terminal.

Appendix 2

The power storage device according to Appendix 1, in which the first power storage module includes a fastening portion for fixing the first power storage module to the housing, and the fastening portion includes a structure configured to compensate variations in dimension of the first power storage module in a stacking direction.

Appendix 3

In the power storage device according to Appendix 1 or 2, the relay current path includes a supporting member fixed to the housing and is configured to fix the first electrode, and a first bus bar having one end fixed to the supporting member, having the other end fixed to the power storage module, and being connected to the first terminal, and in which the first bus bar and the first electrode are fixed to the supporting member at different positions in a direction orthogonal to a stacking direction of the power storage cells.

Appendix 4

The power storage device according to Appendix 3, in which the first bus bar is formed with an elongated hole elongated in a stacking direction of the first power storage module, and further includes a fastener passed through the elongated hole and fixed to the supporting member, and in which variations in the distance between the first terminal and the first electrode are compensated by changing the relative positional relationship between the elongated hole and the fastener in the stacking direction.

Appendix 5

The power storage device according to any one of Appendixes 1 to 4, which further includes a relay circuit fixed to the housing, and in which the first electrode is connected to the relay circuit.

Appendix 6

Moreover, the power storage device according to Appendix 1 or 2, which further includes a safety switch fixed to the housing and capable of being manually manipulated by a worker, and in which the first electrode is connected to the safety switch.

Appendix 7

The power storage device according to Appendix 6, which further includes a second power storage module including a plurality of laminated power storage cells stacked in a direction parallel to the stacking direction of the first power storage module, a third terminal, and a fourth terminal, and being housed within the housing, and in which the third terminal is connected to the first power storage module via the safety switch.

Appendix 8

A power storage device which includes a housing; a first power storage module including a plurality of laminated power storage cells stacked in a first direction, a first terminal, and a second terminal and being housed within the housing; a first electrode and a second electrode fixed to the housing; a first relay current path configured to electrically connect the first terminal to the first electrode; and a second relay current path configured to electrically connect the second terminal to the second electrode, and in which the first relay current path includes a distance adjustment structure configured to compensate variations in the distance between the first electrode and the first terminal.

Appendix 9

The power storage device according to Appendix 8, in which the first power storage module includes a fastening portion for fixing the first power storage module to the housing, and the fastening portion includes a structure configured to compensate variations in dimension in the first direction.

Appendix 10

The power storage device according to Appendix 8 or 9, in which the first relay current path includes a first supporting member fixed to the housing and configured to fix the one electrode, and a first bus bar having one end fixed to the first supporting member, having the other end fixed to the first power storage module, and being connected to the first terminal, and in which the first bus bar and the first electrode are fixed to the first supporting member at different positions in a direction orthogonal to the first direction.

Appendix 11

The power storage device according to Appendix 10, in which the distance adjustment structure includes an elongated hole formed in the first bus bar and elongated in the first direction; and a fastener passed through the elongated hole and fixed to the supporting member, and in which variations in the distance between the first terminal and the first electrode are compensated by changing the relative positional relationship between the elongated hole and the fastener in the first direction.

Appendix 12

The power storage device according to any one of Appendixes 8 to 11, which further includes a relay circuit fixed to the housing, and in which the first electrode is connected to the relay circuit.

Appendix 13

The power storage device according to any one of Appendixes 1 to 5, which further includes a second power storage module including a plurality of laminated power storage cells stacked in a direction parallel to the first direction, a third terminal, and a fourth terminal, and being housed within the housing, and in which the second power storage module is inserted in series into the second relay current path.

Appendix 14

The power storage device according to Appendix 8 or 9, which further includes a safety switch attached to the housing, and in which the first electrode is electrically connected to the first terminal via the safety switch, and the safety switch constitutes a portion of the first relay current path.

Appendix 15

The power storage device according to Appendix 14, in which the distance between the first terminal and the safety switch in the first direction is fixed, and in which the distance adjustment structure adjusts the position of the safety switch in the first direction to fix the safety switch to the housing according to variations in the distance between the first terminal and the first electrode in the first direction.

Appendix 16

The power storage device according to Appendix 15, which further includes a fixing member configured to fix the safety switch, in which the distance adjustment structure includes: an elongated hole formed in the fixing member and elongated in the first direction; and a fastener passed through the elongated hole and fixed to the housing, and in which the position of the safety switch in the first direction is adjusted by changing the relative positional relationship between the elongated hole and the fastener in the first direction.

Appendix 17

The power storage device according to any one of Appendixes 14 to 16, which further includes a second power storage module including a plurality of laminated power storage cells stacked in a direction parallel to the first direction, a third terminal, and a fourth terminal, and being housed within the housing, and in which the second power storage module is inserted in series into the first relay current path by connecting the third terminal to the first terminal via the safety switch and connecting the fourth terminal to the first electrode.

It should be understood that the invention is not limited to the above-described embodiment, but may be modified into various forms on the basis of the spirit of the invention. Additionally, the modifications are included in the scope of the invention.

What is claimed is:

1. A shovel comprising:
a power storage device; and
an electric motor to which electric power is supplied from the power storage device,
wherein the power storage device includes:
a housing;
a first power storage module including a plurality of laminated power storage cells stacked in a first direction, a first terminal, and a second terminal and being housed within the housing;
a first electrode and a second electrode fixed to the housing;
a first relay current path configured to electrically connect the first terminal to the first electrode; and
a second relay current path configured to electrically connect the second terminal to the second electrode, and
wherein the first relay current path includes a distance adjustment structure configured to compensate variations in the distance between the first electrode and the first terminal.

2. The shovel according to claim 1,
wherein the first power storage module includes a fastening portion for fixing the first power storage module to the housing, and the fastening portion includes a structure configured to compensate variations in dimension in the first direction.

3. The shovel according to claim 1,
wherein the first relay current path includes:
a first supporting member fixed to the housing and configured to fix the one electrode; and
a first bus bar having one end fixed to the first supporting member, having the other end fixed to the first power storage module, and being connected to the first terminal, and
wherein the first bus bar and the first electrode are fixed to the first supporting member at different positions in a direction orthogonal to the first direction.

4. The shovel according to claim 3,
wherein the distance adjustment structure includes:
an elongated hole formed in the first bus bar and elongated in the first direction; and
a fastener passed through the elongated hole and fixed to the supporting member, and
wherein variations in the distance between the first terminal and the first electrode are compensated by changing the relative positional relationship between the elongated hole and the fastener in the first direction.

5. The shovel according to claim 1, further comprising:
a relay circuit fixed to the housing,
wherein the first electrode is connected to the relay circuit.

6. The shovel according to claim 1, further comprising:
a second power storage module including a plurality of laminated power storage cells stacked in a direction parallel to the first direction, a third terminal, and a fourth terminal, and being housed within the housing,
wherein the second power storage module is inserted in series into the second relay current path.

7. The shovel according to claim 1, further comprising:
a safety switch attached to the housing,
wherein the first electrode is electrically connected to the first terminal via the safety switch, and the safety switch constitutes a portion of the first relay current path.

8. The shovel according to claim 7,
wherein the distance between the first terminal and the safety switch in the first direction is fixed, and
wherein the distance adjustment structure adjusts the position of the safety switch in the first direction to fix the safety switch to the housing according to variations in the distance between the first terminal and the first electrode in the first direction.

9. The shovel according to claim 8, further comprising:
a fixing member configured to fix the safety switch,
wherein the distance adjustment structure includes:
an elongated hole formed in the fixing member and elongated in the first direction; and
a fastener passed through the elongated hole and fixed to the housing, and
wherein the position of the safety switch in the first direction is adjusted by changing the relative positional relationship between the elongated hole and the fastener in the first direction.

10. The shovel according to claim 7, further comprising:
a second power storage module including a plurality of laminated power storage cells stacked in a direction parallel to the first direction, a third terminal, and a fourth terminal, and being housed within the housing,
wherein the second power storage module is inserted in series into the first relay current path by connecting the third terminal to the first terminal via the safety switch and connecting the fourth terminal to the first electrode.

* * * * *